(12) United States Patent
Imura et al.

(10) Patent No.: US 7,864,033 B2
(45) Date of Patent: Jan. 4, 2011

(54) ACTIVE SAFETY APPARATUS

(75) Inventors: Shinya Imura, Toride (JP); Masaru Yamasaki, Kasumigaura (JP); Tatsuya Yoshida, Naka (JP)

(73) Assignee: Hitachi, Ltd., Tokyo (JP)

( * ) Notice: Subject to any disclaimer, the term of this patent is extended or adjusted under 35 U.S.C. 154(b) by 314 days.

(21) Appl. No.: 11/870,127

(22) Filed: Oct. 10, 2007

(65) Prior Publication Data

US 2008/0088424 A1  Apr. 17, 2008

(30) Foreign Application Priority Data

Oct. 11, 2006 (JP) ............................... 2006-277096

(51) Int. Cl.
*B60Q 1/00* (2006.01)
*G08G 1/16* (2006.01)
*B60D 1/28* (2006.01)

(52) U.S. Cl. ...................... 340/436; 340/435; 340/903; 701/301; 180/271

(58) Field of Classification Search ................. 340/436, 340/435, 903; 701/301; 180/271
See application file for complete search history.

(56) References Cited

U.S. PATENT DOCUMENTS

| | | | | |
|---|---|---|---|---|
| 5,633,642 | A * | 5/1997 | Hoss et al. .................... 342/70 |
| 6,018,308 | A | 1/2000 | Shirai |
| 6,269,308 | B1 * | 7/2001 | Kodaka et al. .............. 701/301 |
| 6,289,281 | B1 * | 9/2001 | Shinmura et al. ........... 701/301 |
| 6,671,595 | B2 * | 12/2003 | Lu et al. ....................... 701/36 |
| 2001/0026238 | A1 | 10/2001 | Shirai et al. |
| 2005/0125155 | A1 * | 6/2005 | Kudo ......................... 701/301 |
| 2005/0267683 | A1 * | 12/2005 | Fujiwara et al. ............. 701/301 |
| 2006/0190175 | A1 * | 8/2006 | Moriizumi et al. .......... 701/301 |
| 2007/0273490 | A1 * | 11/2007 | Fuchs et al. ................. 340/435 |

FOREIGN PATENT DOCUMENTS

EP 1470967 A1 * 10/2004
JP 2005-128722 A 5/2005

OTHER PUBLICATIONS

European Search Report mailed Oct. 7, 2010.

* cited by examiner

*Primary Examiner*—George A Bugg
*Assistant Examiner*—Jack Wang
(74) *Attorney, Agent, or Firm*—Crowell & Moring LLP

(57) ABSTRACT

An active safety device for a motor vehicle comprises: obstacle detection device for detecting an obstacle; vehicle path prediction device for predicting a future path of the vehicle; collision possibility calculation device for calculating the possibility of a collision between the vehicle and the obstacle; and collision responding device for informing a driver of the presence of the obstacle or controlling the vehicle so as not to approach the obstacle according to the possibility of the collision between the vehicle and the obstacle, wherein the device further comprises: obstacle storage device for storing a position of the obstacle; and position estimation device for estimating a relative position between the vehicle and the obstacle from the position of the obstacle stored by the obstacle storage device, a vehicle speed of the vehicle, a yaw angular velocity of the vehicle, and a sideslip angle of the vehicle.

16 Claims, 9 Drawing Sheets

ACTIVE SAFETY APPARATUS

BACKGROUND OF THE INVENTION

The present invention relates to an active safety device that detects an obstacle such as a step on the ground, and informs a driver of the presence of the obstacle or controls a vehicle so as not to approach the obstacle when there is a risk of run off or collision, and to a method of estimating a relative position between the vehicle and the obstacle when a sensor can detect only a range remote from the vehicle and cannot detect an obstacle on the ground near the vehicle.

An active safety device that can respond to a low obstacle such as a step on the ground is disclosed, for example, in JP-A-2005-128722. Such a device scans front of a vehicle with a two-dimensional laser radar to recognize and store an obstacle during traveling, and simultaneously calculates and stores an amount of traveling of the vehicle from a rotational speed of drive wheels. A position of an obstacle determined to be placed outside a detection area after detection is estimated from information on a position of the obstacle at the time of detection and an amount of traveling of the vehicle. A collision between the vehicle and the obstacle is predicted from the detected or estimated position of the obstacle, and when the collision is predicted, a traveling state is corrected so as to prevent the collision. In this manner, a collision with an obstacle even in a dead angle of the laser is avoided.

However, the method of calculating the amount of traveling of the vehicle from the rotational speed of the drive wheels as disclosed in JP-A-2005-128722 cannot measure a lateral velocity of the vehicle though can measure a fore/aft velocity and a yaw angular velocity. The lateral velocity is lower than the fore/aft velocity, but the calculation of the amount of traveling of the vehicle includes an error without measurement or estimation of the lateral velocity. Particularly, the error increases as a range detectable by a sensor is more remote from the vehicle, thereby preventing precise prediction of a collision. Also, as vehicle speed increases, a sideslip angle of the vehicle increases and an amount of lateral movement increases. Therefore, it becomes impossible to effect precise prediction of a collision as vehicle speed increases.

BRIEF SUMMARY OF THE INVENTION

The present invention has an object to provide an active safety device that can estimate a lateral velocity of a vehicle and calculates an amount of traveling of the vehicle using information on the lateral velocity also to precisely predict a collision.

In order to achieve the above described object, an active safety device for a motor vehicle according to the present invention includes: obstacle storage device for storing a position of an obstacle; and position estimation device for estimating a relative position between the vehicle and the obstacle from the position of the obstacle stored by the obstacle storage device, a vehicle speed of the vehicle, a yaw angular velocity of the vehicle, and a sideslip angle of the vehicle.

At this time, the position estimation device preferably estimates a relative position between an obstacle that cannot be detected at present by obstacle detection device and the vehicle from the position of the obstacle stored by the obstacle storage device, the vehicle speed of the vehicle, the yaw angular velocity of the vehicle, and the sideslip angle of the vehicle.

Also, the position estimation device preferably estimates a present position of the vehicle from the vehicle speed of the vehicle, the yaw angular velocity of the vehicle, and the sideslip angle of the vehicle.

Further, the position estimation device preferably estimates a relative position between a tire of the vehicle and the obstacle from the position of the obstacle stored by the obstacle storage device, the vehicle speed of the vehicle, the yaw angular velocity of the vehicle, the sideslip angle of the vehicle, and a relative position between a vehicle body and the tire of the vehicle.

Further, the obstacle storage device preferably changes a cycle of storing the position of the obstacle according to the vehicle speed of the vehicle.

Further, the active safety device for a motor vehicle according to the present invention preferably includes obstacle storage elimination device for eliminating storage of one obstacle when stored two obstacles are positioned close to each other.

Further, the obstacle storage device preferably changes the number of obstacles to be stored according to the vehicle speed of the vehicle.

Further, the active safety device for a motor vehicle according to the present invention preferably includes sideslip angle estimation device for estimating a sideslip angle of the vehicle from the vehicle speed of the vehicle, a steering angle of the vehicle, and/or the yaw angular velocity of the vehicle.

In order to achieve the above described object, an active safety device for a motor vehicle according to the present invention includes: obstacle storage device for changing a cycle of storing a position of an obstacle according to a vehicle speed of the vehicle; and position estimation device for estimating a relative position between the vehicle and the obstacle from the position of the obstacle stored by the obstacle storage device, and a state of the vehicle.

According to the present invention, the active safety device can precisely predict a collision even if a sensor can detect only a range remote from the vehicle and cannot detect a low obstacle such as a step on the ground near the vehicle, or a vehicle speed is high, and inform a driver of the presence of the obstacle or control the vehicle so as not to approach the obstacle when there is a risk of run off or collision.

Other objects, features and advantages of the invention will become apparent from the following description of the embodiments of the invention taken in conjunction with the accompanying drawings.

DETAILED DESCRIPTION OF THE INVENTION

Now, an embodiment of the present invention will be described.

Embodiment 1

Figure 1:
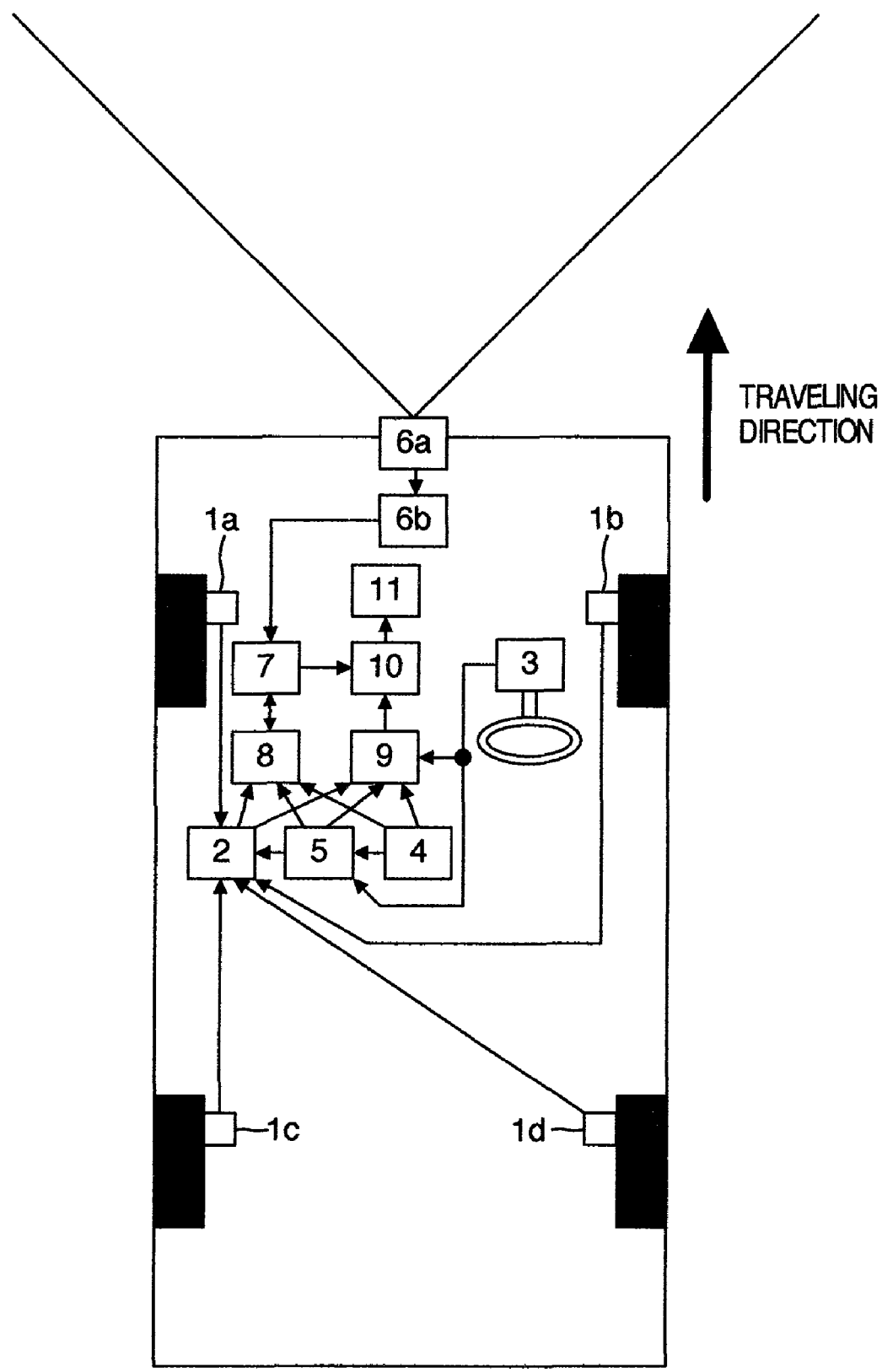
FIG. 1 is an example of a configuration of a motor vehicle to which Embodiment 1 is applied.
Figure 2:
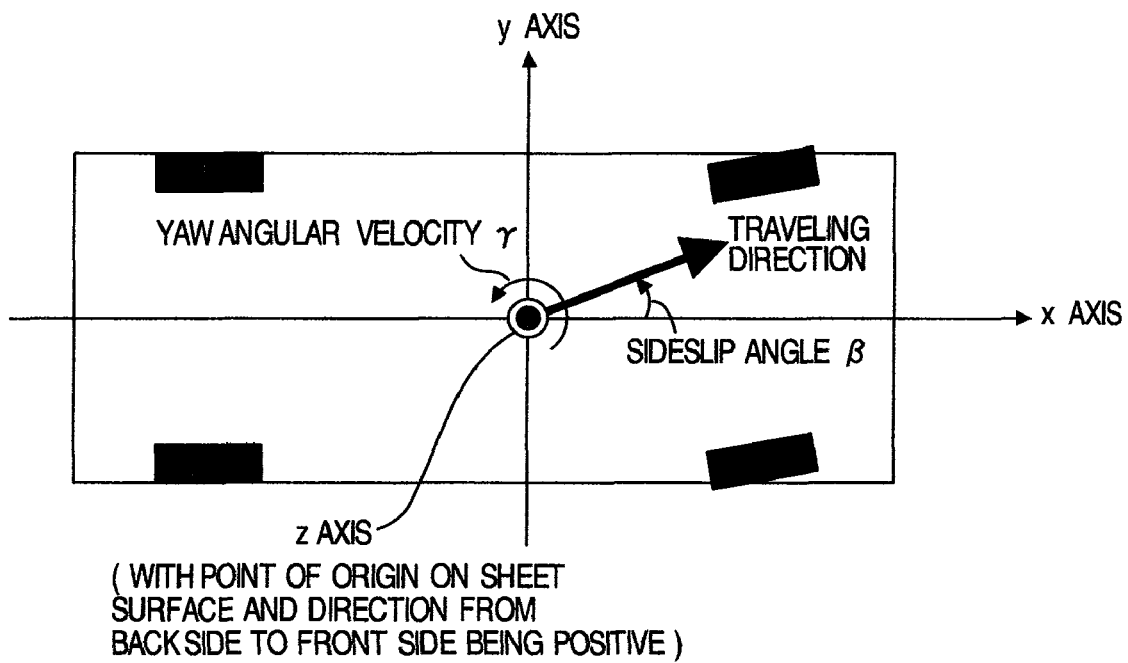
FIG. 2 shows a vehicle fixed coordinate system viewed from above the vehicle.

FIG. 1 shows a configuration of a motor vehicle to which Embodiment 1 of the present invention is applied. A vehicle fixed coordinate system hereinafter indicated is a coordinate system with a point on the ground vertically down from the center of gravity of the vehicle being a point of origin, a forward direction of a vehicle body being positive on an x-axis, a leftward direction of the vehicle body being positive on a y-axis, and a vertically upward direction being positive on a z-axis as shown in FIG. 2 viewed from above the vehicle.

Wheel speed sensors 1*a*, 1*b*, 1*c* and 1*d* are provided in all wheels of the vehicle, and measure a rotational speed of each wheel.

Vehicle speed calculation device 2 calculates a traveling speed of each wheel from the rotational speed of each wheel measured by the wheel speed sensors 1*a*, 1*b*, 1*c* and 1*d*, and a radius of a tire previously set according to the vehicle, and calculates a vehicle speed V of the vehicle from the traveling speed of each wheel. The vehicle speed V may be an average value of traveling speeds of the wheels, an average value of traveling speeds of the slowest wheel and the second slowest wheel in view of the case of spin of some wheels, or the traveling speed of the second slowest wheel in view of the case of failure of the sensors.

A steering angle sensor 3 measures a steering angle $\delta$ of the vehicle. The steering angle $\delta$ is indicated with an angle in straight driving of the vehicle being zero and a counterclockwise direction being positive.

A yaw angular velocity sensor 4 measures a yaw angular velocity $\gamma$ of the vehicle. The yaw angular velocity $\gamma$ is an angular speed of the vehicle around the z-axis on the vehicle fixed coordinate system and indicated with a counterclockwise direction being positive.

Yaw angular velocity estimation device may be used instead of the yaw angular velocity sensor 4. The yaw angular velocity estimation device calculates the yaw angular velocity $\gamma$ from an average traveling speed Vl of left two wheels, an average traveling speed Vr of right two wheels, and an average lateral distance of front and rear wheels previously set according to the vehicle by the following expression.

$$\gamma = \frac{Vr - Vl}{tv} \quad \text{[Expression 1]}$$

The yaw angular velocity estimation device may calculate the yaw angular velocity $\gamma$ from the vehicle speed V, the steering angle $\delta$, an arithmetical operation cycle $\Delta t1$ of the yaw angular velocity estimation device, a yaw angular velocity $\gamma z$ of the last arithmetical operation cycle, a sideslip angle $\beta z$ (described later) of the last arithmetical operation cycle, and vehicle yaw inertia moment I, a distance between centers of gravity of front axes lf, a distance between centers of gravity of rear axes lr, front wheel cornering power Kf, rear wheel cornering power Kr, and a steering gear ratio Rs which are previously set according to the vehicle by the following expression (Reference: Masato Abe, "Movement and Control of Motor Vehicle" 2nd ed. (Sankaido)).

$$\gamma = \gamma z + \frac{1}{I} \cdot \left\{ 2 \cdot lf \cdot Kf \cdot \frac{\delta}{Rs} - 2 \cdot (lf \cdot Kf - lr \cdot Kr) \cdot \beta z - \frac{2}{V} \cdot (lf^2 \cdot Kf + lr^2 \cdot Kr) \cdot \gamma z \right\} \cdot \Delta t1 \quad \text{[Expression 2]}$$

Sideslip angle estimation device 5 measures a sideslip angle $\beta$ of the vehicle from the vehicle speed V, the steering angle $\delta$, the yaw angular velocity $\gamma$, an arithmetical operation cycle $\Delta t1$ of the sideslip angle estimation device 5 (for example, $\Delta t1=50$ ms), a yaw angular velocity $\gamma z$ of the last arithmetical operation cycle, a sideslip angle $\beta z$ of the last arithmetical operation cycle, and a vehicle weight m, the distance between centers of gravity of front axes lf, the distance between centers of gravity of rear axes lr, the front wheel cornering power Kf, the rear wheel cornering power Kr, and the steering gear ratio Rs which are previously set according to the vehicle by the following expression. The sideslip angle $\beta$ is an angle of the center of gravity of the vehicle in a traveling direction relative to the x-axis on the vehicle body fixed coordinate system and indicated with a counterclockwise direction being positive.

$$\beta = \beta z + \frac{1}{m \cdot V} \left[ 2 \cdot Kf \cdot \frac{\delta}{Rs} - 2 \cdot (Kf + Kr) \cdot \beta z - \left\{ m \cdot V + \frac{2}{V} \cdot (lf \cdot Kf - lr \cdot Kr) \right\} \cdot \gamma z \right] \cdot \Delta t1 \quad \text{[Expression 3]}$$

As is apparent from Expression 3, the sideslip angle $\beta$ significantly changes with the vehicle speed. In the present invention, however, position estimation using the sideslip angle $\beta$ is performed by a method described later, thereby allowing precise prediction of a collision even if the vehicle speed changes.

Sideslip angle measurement device may be used instead of the sideslip angle estimation device 5. The sideslip angle measurement device measures a speed Vx of the vehicle in an x-axis direction on the vehicle body fixed coordinate system, and a speed Vy of the vehicle in a y-axis direction on the vehicle body fixed coordinate system using millimeter wave radar or the like, and calculates the sideslip angle $\beta$ using $\tan^{-1}(Vy/Vx)$.

Figure 3:
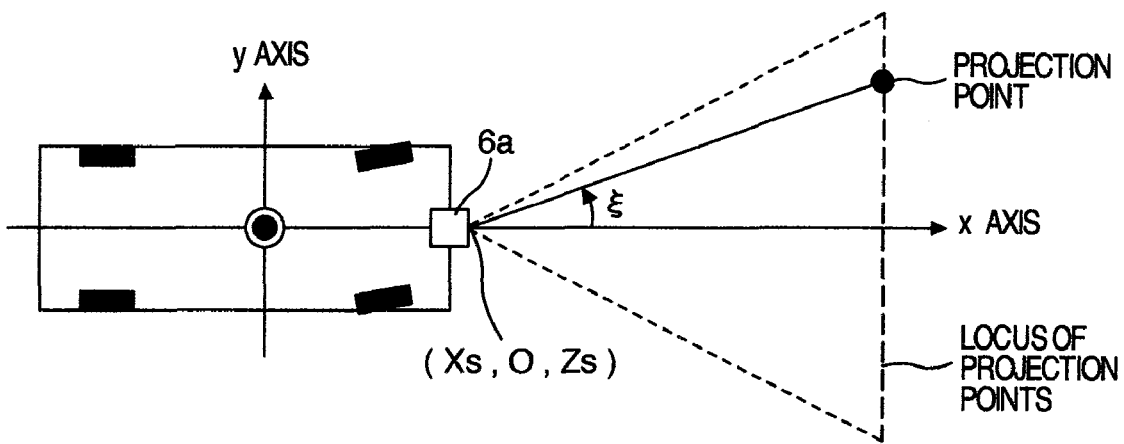
FIG. 3 shows a radar and a laser viewed from above the vehicle.
Figure 4:
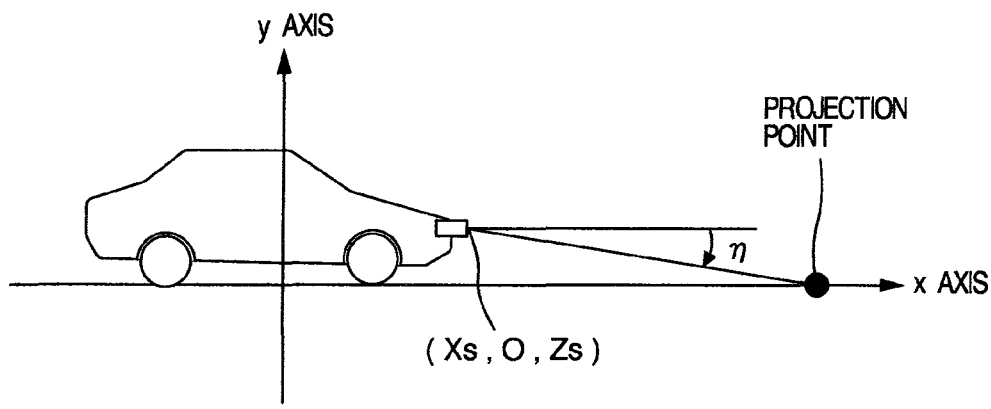
FIG. 4 shows a radar and a laser viewed from a right side of the vehicle.

Obstacle detection device 6 is constituted by radar 6*a* and obstacle determination device 6*b*. The radar 6*a* is secured to the vehicle body with an angle of depression, projects a laser to the ground in front of the vehicle (for example, the ground 10 m ahead of the vehicle), and measures a distance between a projection point and the radar 6*a* from reflected light of the laser. The radar 6*a* quickly laterally moves a direction of the laser (scans), and a locus of projection points forms a line on the ground. As shown in FIG. 3 viewed from above the vehicle and FIG. 4 viewed from right side of the vehicle, a vehicle fixed coordinate of the projection point when the projection point is in an x-y plane, that is, when a part without irregularities on the ground is scanned is expressed by the following expression, $$\left(Xs + \frac{Zs}{\tan\eta},\ \frac{Zs}{\tan\eta}\cdot\tan\xi,\ 0\right) \quad \text{[Expression 4]}$$

where (Xs, 0, Zs) is a vehicle fixed coordinate of the position at which the radar 6a is secured, η is an angle of the laser to the x-y plane (the angle of depression), and ξ is an angle of the laser to an x-z plane.

Figure 5:
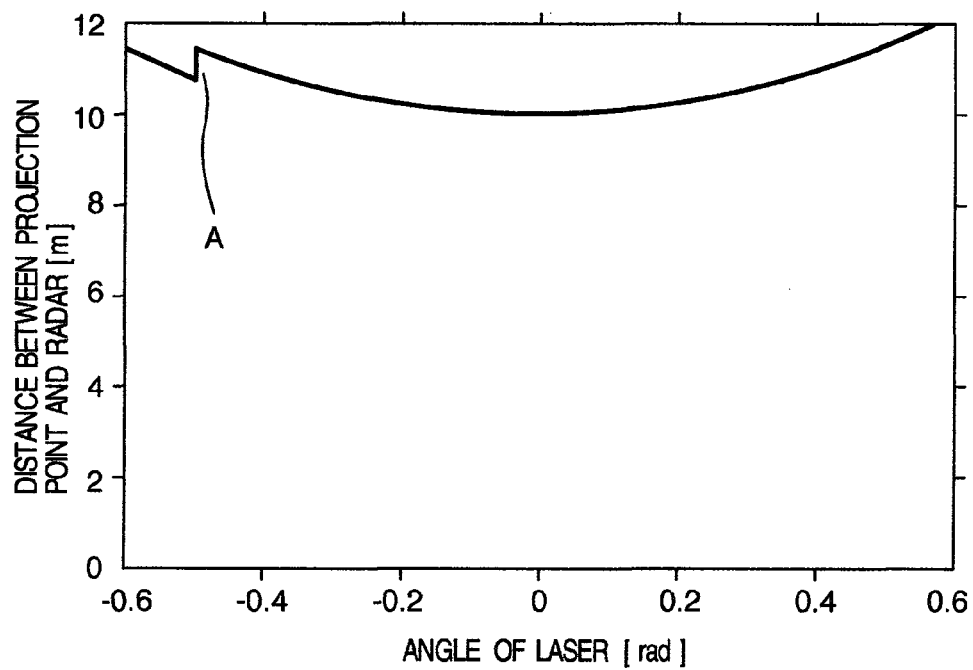
FIG. 5 shows an example of a result of scanning with the radar and measurement of a distance to the ground.

The obstacle determination device 6b determines, as an obstacle, a point at which the distance between the projection point and the radar 6a suddenly changes among the scanned positions. For example, when the result of scanning and measurement of the distance is as shown in FIG. 5, the point A in FIG. 5 is determined as an obstacle. The point at which the distance between the projection point and the radar 6a suddenly changes and that is determined as an obstacle includes, for example, a gutter, a curb, a wall, a guardrail, and a gate of a highway.

Obstacle storage device 7 stores an x coordinate Xo [k0] and a y coordinate Yo [k0] on the vehicle fixed coordinate system of the obstacle detected by the obstacle detection device 6. The number k0 is an obstacle number assigned to each detected obstacle, and numbers of 1 to an obstacle storage number ke (for example, ke=100) are assigned. When the number of stored obstacles reaches the obstacle storage number ke, information on the oldest obstacle detected by the obstacle detection device 6 is eliminated, and information on a new obstacle is stored instead. The obstacle storage device 7 stores an obstacle position for each arithmetical operation cycle Δt2 (for example, Δt2=50 ms) when the vehicle speed V is high (for example, V≧5 km/h), and stores an obstacle position at arithmetical operation timing of the obstacle storage device 7 immediately after the vehicle travels a certain distance (for example, 10 cm) when the vehicle speed V is low. The reason why the timing for storing the obstacle position is changed according to the vehicle speed V is to prevent positions of obstacles in the same position or close positions from being redundantly stored when the vehicle is stopped or the vehicle speed V is low.

The obstacle storage device 7 may store information on the obstacle at an always constant arithmetical operation cycle Δt2, and obstacle storage elimination device (not shown) may be separately provided. The obstacle storage elimination device eliminates storage of one obstacle when two obstacles stored by the obstacle storage device 7 are positioned close to each other. This can prevent positions of obstacles in the same position or close positions from being redundantly continuously stored.

Obstacle position estimation device 8 estimates present positions of all obstacles stored by the obstacle storage device 7, and updates information on the obstacles in the obstacle storage device 7. A present position (Xo[k],Yo[k])(k=1 to ke) of each obstacle is calculated from the vehicle speed V, the yaw angular velocity γ, the sideslip angle β, the arithmetical operation cycle Δt2, and an obstacle position (Xoz[k],Yoz[k]) of the last arithmetical operation cycle by the following expression.

$$\begin{bmatrix} Xo[k] \\ Yo[k] \end{bmatrix} = \begin{bmatrix} \cos(-\gamma\cdot\Delta t2) & -\sin(-\gamma\cdot\Delta t2) \\ \sin(-\gamma\cdot\Delta t2) & \cos(-\gamma\cdot\Delta t2) \end{bmatrix} \quad \text{[Expression 5]}$$

$$\begin{bmatrix} Xoz[k] - V\cdot\Delta t2 \\ Yoz[k] - V\cdot\beta\cdot\Delta t2 \end{bmatrix}$$

Vehicle path prediction device 9 first calculates a yaw angular velocity γ[0], a sideslip angle β[0], a yaw angle θ[0], and a center of gravity position of the vehicle (Xv[0], Yv[0]) at the present time from the yaw angular velocity γ and the sideslip angle β by the following expression.

$$\gamma[0]=\gamma$$

$$\beta[0]=\beta$$

$$\theta[0]=0 \quad \text{[Expression 6]}$$

$$Xv[0]=0$$

$$Yv[0]=0$$

The vehicle path prediction device 9 then repeatedly calculates a yaw angular velocity γ[n], a sideslip angle β[n], a yaw angle θ[n], a center of gravity position of the vehicle (Xv[n],Yv[n]), and wheel positions (Xt1[n],Yt1[n]), (Xt2[n], Yt2[n]), (Xt3[n], Yt3[n]) and (Xt4[n], Yt4[n]) after Δt3×n seconds from the vehicle speed V, the steering angle δ, a previously set prediction time interval Δt3 (for example, Δt3=50 ms), and the vehicle weight m, the vehicle yaw inertia moment I, the distance between centers of gravity of front axes lf, the distance between centers of gravity of rear axes lr, a lateral distance between front wheels tf, a lateral distance between rear wheels tr, the front wheel cornering power Kf, the rear wheel cornering power Kr, and the steering gear ratio Rs which are previously set according to the vehicle, while assigning 1, 2, 3 . . . in order to n in the following expression. The yaw angle θ[n] is an angle of the vehicle body relative to the x-axis on the vehicle body fixed coordinate system at n=0 (the present time) and indicated with a counterclockwise direction being positive. Also, the center of gravity position of the vehicle (Xv[n], Yv[n]) and the wheel positions (Xt1[n], Yt1[n]), (Xt2[n], Yt2[n]), (Xt3[n], Yt3[n]) and (Xt4[n], Yt4[n]) are also indicated on the vehicle body fixed coordinate system at n=0 (the present time).

$$\gamma[n] = \gamma[n-1] + \frac{1}{I}\cdot\left\{2\cdot lf\cdot Kf\cdot\frac{\delta}{Rs} - 2\cdot(lf\cdot Kf - lr\cdot Kr)\cdot\right. \quad \text{[Expression 7]}$$

$$\left.\beta[n-1] - \frac{2}{V}\cdot(lf^2\cdot Kf + lr^2\cdot Kr)\cdot\gamma[n-1]\right\}\cdot\Delta t3$$

$$\beta[n] = \beta[n-1] + \frac{1}{m\cdot V}\cdot\left[2\cdot Kf\cdot\frac{\delta}{Rs} -\right.$$

$$2\cdot(Kf + Kr)\cdot\beta[n-1] - \left\{m\cdot V +\right.$$

$$\left.\left.\frac{2}{V}\cdot(lf\cdot Kf - lr\cdot Kr)\right\}\cdot\gamma[n-1]\right]\cdot\Delta t3$$

$$\theta[n] = \theta[n-1] + \gamma[n]\cdot\Delta t3$$

$$Xv[n] = Xv[n-1] + V\cdot\cos(\beta[n] + \theta[n])\cdot\Delta t3$$

$$Yv[n] = Yv[n-1] + V\cdot\sin(\beta[n] + \theta[n])\cdot\Delta t3$$

$$Xt1[n] = Xv[n] + lf\cdot\cos(\theta[n]) - tf/2\cdot\sin(\theta[n])$$

$$Yt1[n] = Yv[n] + lf\cdot\sin(\theta[n]) + tf/2\cdot\cos(\theta[n])$$

$$Xt2[n] = Xv[n] + lf\cdot\cos(\theta[n]) + tf/2\cdot\sin(\theta[n])$$

-continued $$Yt2[n] = Yv[n] + lf \cdot \sin(\theta[n]) - tf/2 \cdot \cos(\theta[n])$$

$$Xt3[n] = Xv[n] - lr \cdot \cos(\theta[n]) - tr/2 \cdot \sin(\theta[n])$$

$$Yt3[n] = Yv[n] - lr \cdot \sin(\theta[n]) + tr/2 \cdot \cos(\theta[n])$$

$$Xt4[n] = Xv[n] - lr \cdot \cos(\theta[n]) + tr/2 \cdot \sin(\theta[n])$$

$$Yt4[n] = Yv[n] - lr \cdot \sin(\theta[n]) - tr/2 \cdot \cos(\theta[n])$$

The repeated calculation in the above expression is performed until n reaches a previously set prediction finish cycle ne (for example, ne=40). A longer prediction time interval Δt3 or a longer prediction finish cycle ne allows prediction for a longer time. However, when the prediction time interval Δt3 is increased, prediction accuracy is deteriorated, and when the prediction finish cycle ne is increased, calculation time is increased. The prediction time interval Δt3 and the prediction finish cycle ne are determined in view of necessary prediction time, necessary prediction accuracy, an arithmetical operation capability of a computer to be used, or the like.

When the vehicle speed V is high, the number of obstacles to be stored may be reduced to increase the prediction finish cycle ne or the arithmetical operation cycle Δt3 may be increased so that prediction for a longer time can be performed. In the case of reducing the number of obstacles to be stored, storage of obstacles in positions which the vehicle is less likely to reach is reduced by priority.

Collision possibility calculation device 10 repeatedly calculates while assigning all combinations of k and n to the following expression in order to determine whether distances between the present position (Xo[k], Yo[k]) of each obstacle calculated by the obstacle position estimation device 8 and predicted positions (Xt1[n], Yt1[n]), (Xt2[n], Yt2[n]), (Xt3[n], Yt3[n]) and (Xt4[n], Yt4[n]) of the wheels after Δt3×n seconds calculated by the vehicle path prediction device 9 are a previously set threshold value d0 (for example, d0=10 cm) or less.

$$\sqrt{(Xt1[n]-Xo[k])^2+(Yt1[n]-Yo[k])^2} \leq d0$$

or $$\sqrt{(Xt2[n]-Xo[k])^2+(Yt2[n]-Yo[k])^2} \leq d0$$

or  [Expression 8]

$$\sqrt{(Xt3[n]-Xo[k])^2+(Yt3[n]-Yo[k])^2} \leq d0$$

or $$\sqrt{(Xt4[n]-Xo[k])^2+(Yt4[n]-Yo[k])^2} \leq d0$$

Also, in order to reduce arithmetical operation time, the collision possibility calculation device 10 may use the following expression instead of Expression 8.

$$(Xt1[n]-Xo[k])^2+(Yt1[n]-Yo[k])^2 \leq d0^2$$

or $$(Xt2[n]-Xo[k])^2+(Yt2[n]-Yo[k])^2 \leq d0^2$$

or  [Expression 9]

$$(Xt3[n]-Xo[k])^2+(Yt3[n]-Yo[k])^2 \leq d0^2$$

or $$(Xt4[n]-Xo[k])^2+(Yt4[n]-Yo[k])^2 \leq d0^2$$

The larger threshold value d0 in Expression 8 or 9 reduces cases of determination that there is no possibility of a collision though there is actually a possibility of a collision, but actually, cases of determination that there is a possibility of a collision though there is actually no possibility of a collision are increased. The threshold value d0 is determined in view of errors of the sensors, errors of parameters previously set according to the vehicle, or calculation errors caused by a length of the arithmetical operation cycle or a length of the prediction time interval.

In view of the fact that calculation errors increase when the vehicle speed V becomes high, the higher the vehicle speed V is, the larger the threshold value d0 may be.

Collision responding device 11 informs a driver of the presence of the obstacle or controls the vehicle so as not to approach the obstacle according to the smallest n among the values of n that meet Expression 8 or 9 if present. For example, when Δt3×n is larger than 2 seconds, no operation is performed, and when Δt3×n is 2 seconds or less, a warning is issued by a warning sound, and/or notification by voice, and/or display on a screen. When Δt3×n is less than 1 second, besides the warning, a soft brake is applied, or reaction of a steering wheel is increased if the driver is turning the steering wheel in a direction of a collision.

When the vehicle speed V is high, the warning or control may be performed earlier. For example, in the above example, when the vehicle speed V is 40 km/h or more, the warning is issued at Δt3×n of 3 seconds or less, and the soft brake may be applied at Δt3×n of 2 seconds or less.

It may be allowed that when the driver is stepping on the brake, it is determined that the driver recognizes a danger, and no warning by a warning sound is issued.

Regardless of whether Expression 8 or 9 is met, the position (Xo[k], Yo[k]) of the obstacle may be displayed by drawing on the screen. At the time, the position may be displayed in synthesized manner with an actual image taken by a separately provided camera (not shown).

Figure 6:
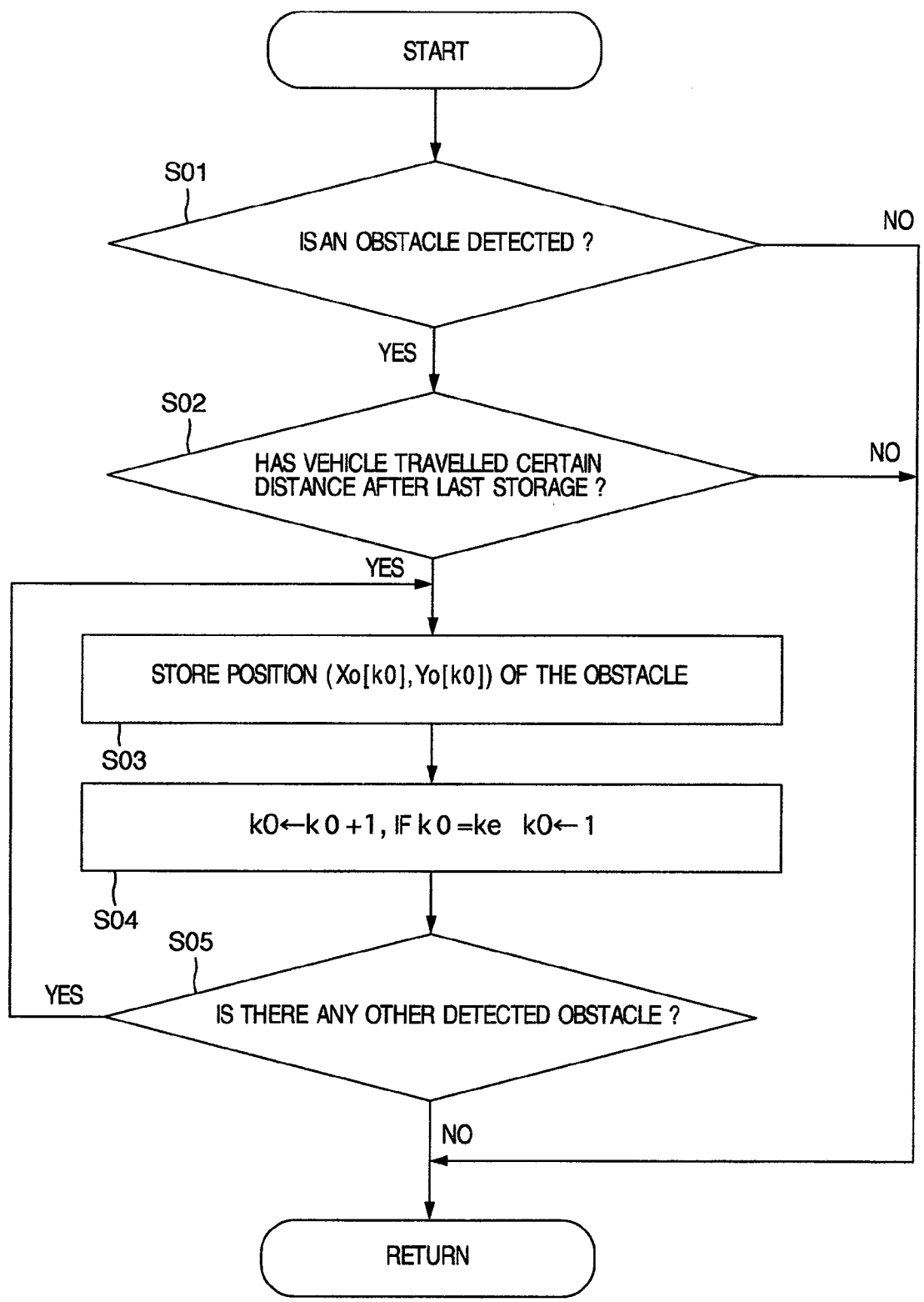
FIG. 6 shows an example of a flow of calculation by obstacle storage device.
Figure 7:
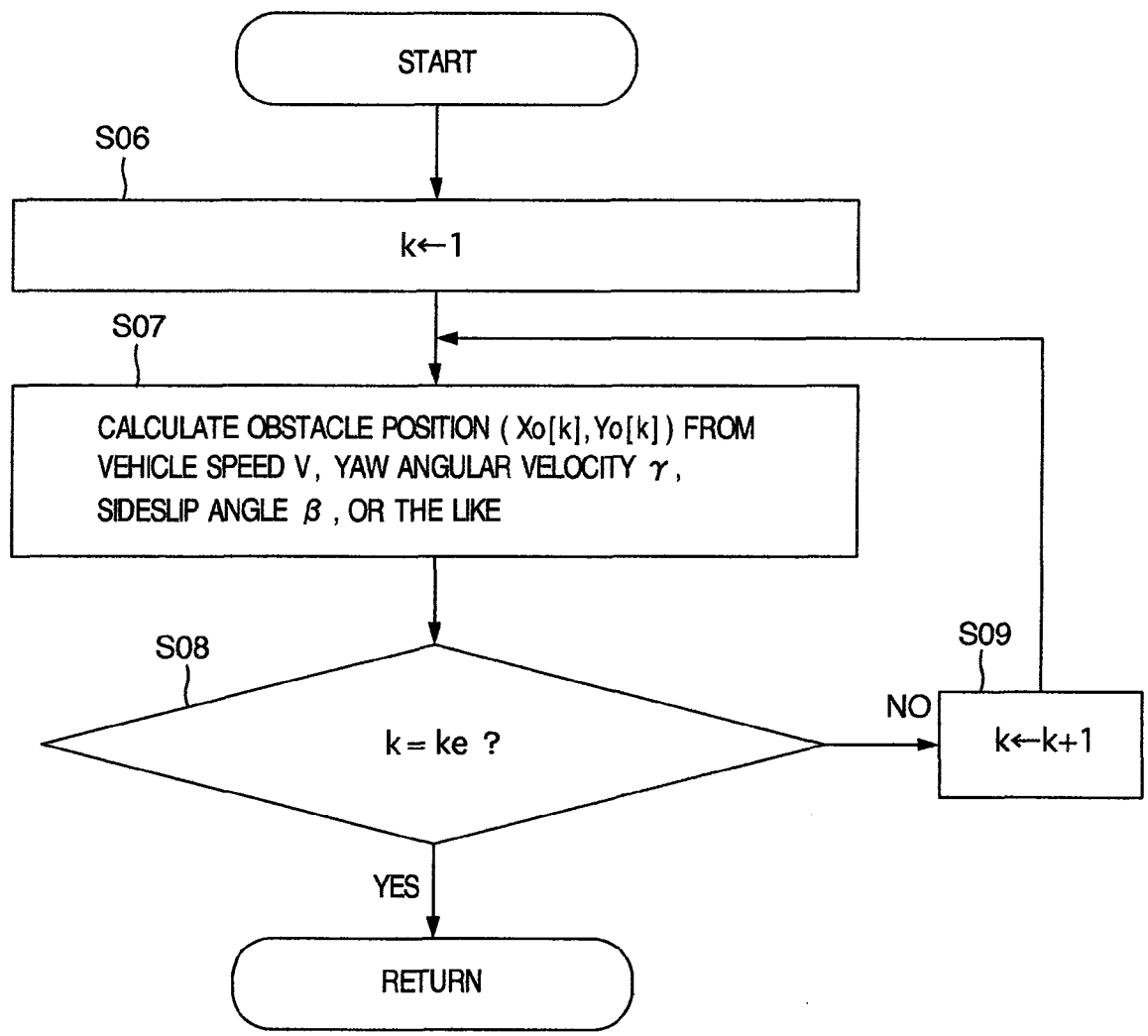
FIG. 7 shows an example of a flow of calculation of obstacle position estimation device in Embodiment 1.
Figure 8:
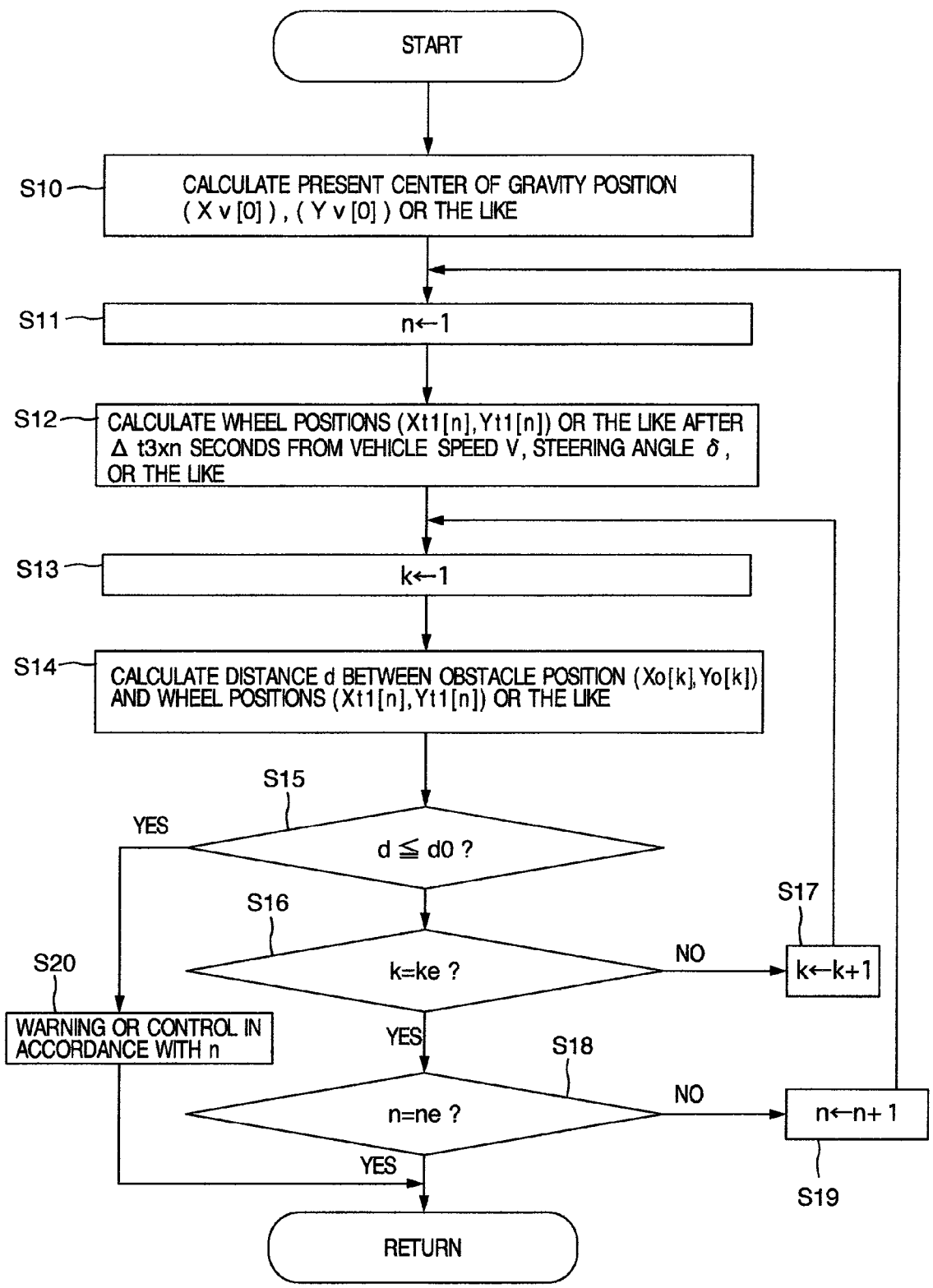
FIG. 8 shows an example of a flow of calculation and processing by vehicle path prediction device, collision possibility calculation device, and collision responding device.

FIGS. 6 to 8 show flows of calculation performed in one arithmetical operation cycle Δt2 of the obstacle storage device 7, the obstacle position estimation device 8, the vehicle path prediction device 9, the collision possibility calculation device 10, and the collision responding device 11.

FIG. 6 shows a flow of calculation by the obstacle storage device 7. First, in S01, it is determined whether the obstacle detection device 6 detects an obstacle. When it is determined that the obstacle detection device 6 detects the obstacle, the process proceeds to S02, and when it is determined that the obstacle detection device 6 does not detect the obstacle, the calculation by the obstacle storage device 7 is finished. In S02, it is determined whether the vehicle has traveled a certain distance after the last storage of an obstacle. When it is determined that the vehicle has traveled a certain distance, the process proceeds to S03, and when it is determined that the vehicle has not traveled a certain distance, the calculation by the obstacle storage device 7 is finished. In S03, a position (Xo[k0], Yo[k0]) of the detected obstacle is stored. Then in S04, an obstacle number k0 for next storage is updated. Then in S05, it is determined whether there is an obstacle that has not been yet stored among detected obstacles. When it is determined that there is an obstacle that has not been yet stored, the process returns to S03, and when it is determined that there is no obstacle that has not been yet stored, the calculation by the obstacle storage device 7 is finished.

After the calculation by the obstacle storage device 7 is finished, calculation by the obstacle position estimation device 8 shown in FIG. 7 is performed. First in S06, an initial value of 1 is assigned to k. Then in S07, a position (Xo[k], Yo[k]) of a kth obstacle is calculated using Expression 5. Then in S08, it is determined whether k matches the obstacle storage number ke. When k matches the obstacle storage number ke, the calculation by the obstacle position estimation device 8 is finished, and when k does not match the obstacle storage number ke, the process proceeds to S09. In S09, k is counted up, and the process returns to S07.

After the calculation by the obstacle position estimation device 8 is finished, calculation and processing by the vehicle path prediction device 9, the collision possibility calculation device 10, and the collision responding device 11 shown in FIG. 8 are performed. S10 to S12, S19 and S20 relate to the calculation by the vehicle path prediction device 9, S13 to S17 relate to the calculation by the collision possibility calculation device 10, and S20 relates to the processing by the collision responding device 11.

First in S10, a yaw angular velocity $\gamma[0]$, a sideslip angle $\beta[0]$, a yaw angle $\theta[0]$, and a center of gravity position of the vehicle (Xv[0], Yv[0]) at the present time are calculated using Expression 6. Then in S11, an initial value of 1 is assigned to n. Then, in S12, a yaw angular velocity $\gamma[n]$, a sideslip angle $\beta[n]$, a yaw angle $\theta[n]$, a center of gravity position of the vehicle (Xv[n], Yv[n]), and wheel positions (Xt1[n], Yt1[n]), (Xt2[n], Yt2[n]), (Xt3[n], Yt3[n]) and (Xt4[n], Yt4[n]) after $\Delta t3 \times n$ seconds are calculated using Expression 7. Then, in S13, an initial value of 1 is assigned to k. Then in S14, distances d1, d2, d3 and d4 between the present position (Xo[k], Yo[k]) of the obstacle and predicted positions (Xt1[n], Yt1[n]), (Xt2[n], Yt2[n]), (Xt3[n], Yt3[n]) and (Xt4[n], Yt4[n]) of the wheels after $\Delta t3 \times n$ seconds are calculated using Expression 8. Then in S15, it is determined whether any one of the distances d1, d2, d3 and d4 is the threshold value d0 or less. When it is determined that any one of the distances is the threshold value d0 or less, the process proceeds to S20, and when it is determined that all the distances exceed the threshold value d0, the process proceeds to S16. In S16, it is determined whether k matches the obstacle storage number ke. When it is determined that k matches the obstacle storage number ke, the process proceeds to S18, and when it is determined that k does not match the obstacle storage number ke, the process proceeds to S17. In S17, k is counted up, and the process returns to S14. In S18, it is determined whether n matches ne. When it is determined that n matches ne, the calculation is finished, and when it is determined that n does not match ne, the process proceeds to S19. In S19, n is counted up, and the process returns to S12. In S20, the driver is informed of the presence of an obstacle or the vehicle is controlled so as not to approach the obstacle according to n.

Figure 9:
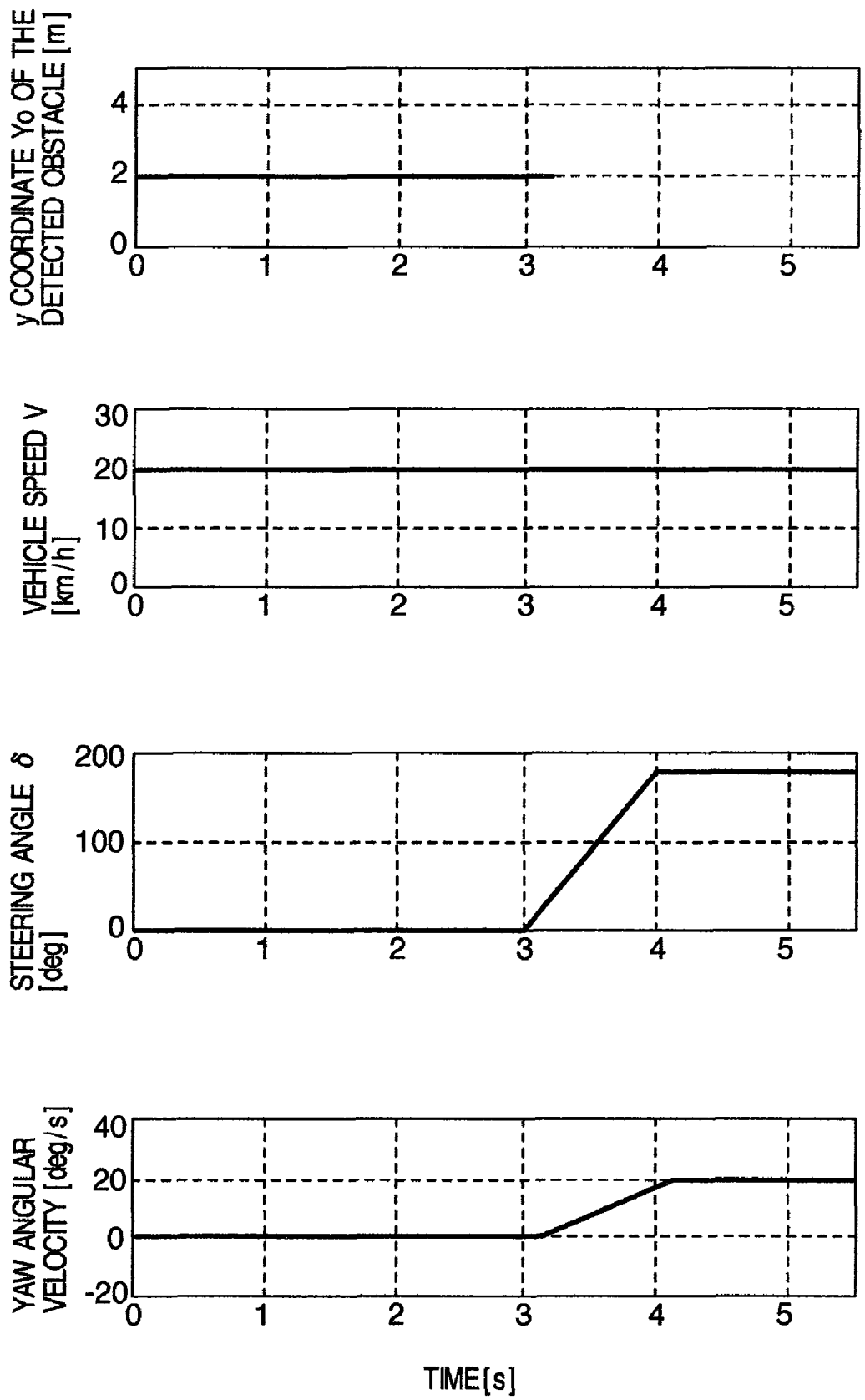
FIG. 9 shows an example of time-series data of signals input to the obstacle storage device, the obstacle position estimation device, and the vehicle path prediction device.
Figure 10:
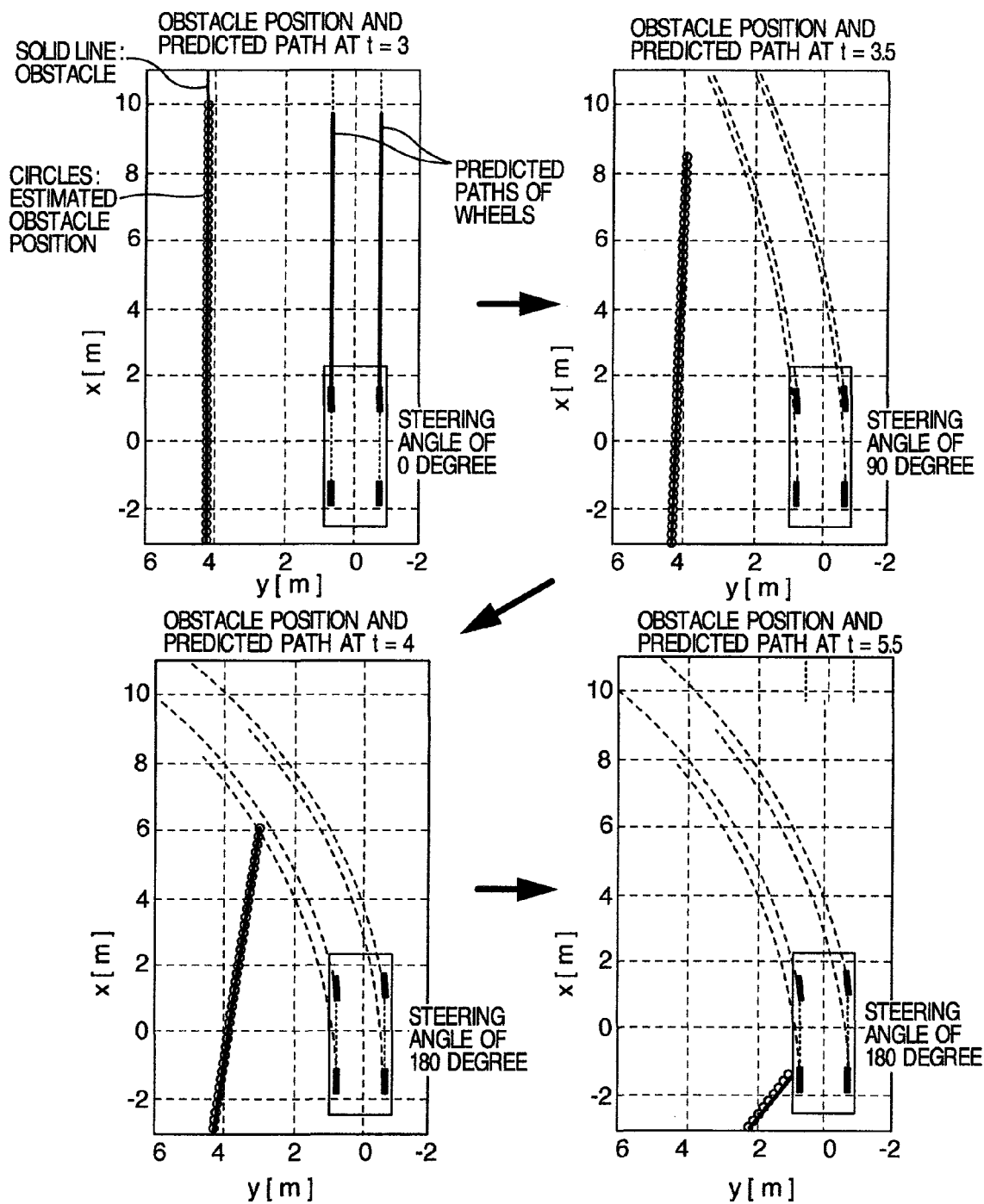
FIG. 10 shows an example of an actual position of an obstacle relative to the vehicle, a position of the obstacle estimated by the obstacle position estimation device, and a predicted path of each wheel of the vehicle predicted by the vehicle path prediction device for each time.
Figure 11:
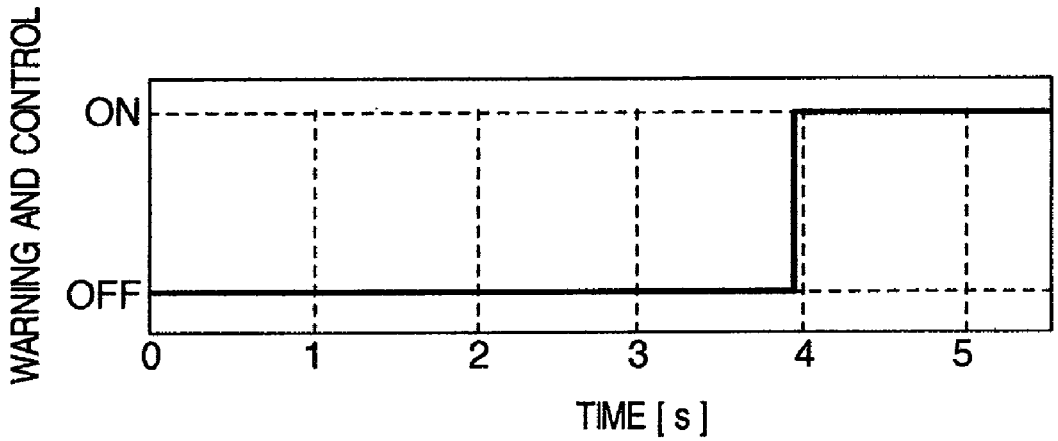
FIG. 11 shows an example of time-series data of whether the collision responding device issues a warning or controls the vehicle.

FIGS. 9 to 11 show examples of an operation of Embodiment 1 of the present invention. This example shows a situation where obstacles such as curbs or a gutter continuously exist on left side of the vehicle traveling at 20 km/m, and the vehicle is about to turn left at a break of the obstacles. In this example, the obstacle detection device 6 scans the ground 10 m ahead of the vehicle, and an x coordinate Xo[k0] of the obstacle when detected is always 10 m.

FIG. 9 shows time-series data of signals input to the obstacle storage device 7, the obstacle position estimation device 8, and the vehicle path prediction device 9. The top graph shows time-series data of a y coordinate Yo[k] of the detected obstacle, and the obstacle is detected until time of 3.2 seconds, but thereafter there is a break of the obstacles and no obstacle is detected. The second graph from the top shows time-series data of the vehicle speed V, and reveals that the vehicle travels substantially at a constant speed of 20 km/h. The third graph from the top shows time-series data of the steering angle $\delta$, and reveals that the driver starts gradually turning the steering wheel at time of 3.0 seconds, and the steering angle reaches 180° at time t=4.0 seconds and is constant at 180° thereafter. The bottom graph shows time-series data of the yaw angular velocity, and reveals that the yaw angular velocity is increased as the driver starts turning the steering wheel.

FIG. 10 shows an actual position of the obstacle relative to the vehicle, a position of the obstacle estimated by the obstacle position estimation device 8, and a predicted path of each wheel of the vehicle predicted by the vehicle path prediction mean 9 for each time. The upper left drawing shows the case at time t=3.0 seconds, the upper right drawing shows the case at time t=3.5 seconds, the lower left drawing shows the case at time t=4.0 seconds, and the lower right drawing shows the case at time t=5.5 seconds. The position of the obstacle estimated by the obstacle position estimation device 8 substantially matches the actual obstacle position, which reveals that the obstacle position estimation device 8 can accurately estimate the position. At the time t=4.0 seconds, a predicted path of a left rear wheel of the vehicle predicted by the vehicle path prediction device 9 substantially overlaps the position of the obstacle, but as shown in FIG. 9, the steering angle $\delta$ is not changed after the time t=4.0 seconds, and thus a collision occurs as predicted at time t=5.5 seconds, which reveals that the vehicle path prediction device 9 can accurately predict the path.

FIG. 11 shows time-series data of whether the collision responding device 11 issues a warning or controls the vehicle. The collision responding device 11 is on at time t=3.95 seconds, and after this time, the collision responding device 11 informs the driver of the presence of the obstacle or controls the vehicle so as not to approach the obstacle.

As described above, even when the sensor can detect only a range remote from the vehicle and cannot detect an obstacle on the ground near the vehicle, estimation of the obstacle position and prediction of the vehicle path can be precisely performed, and the driver can be informed of the presence of the obstacle or the vehicle can be controlled so as not to approach the obstacle when there is a risk of run off or collision.

Even when the vehicle speed is high, the sideslip angle estimation device can calculate the sideslip angle according to the vehicle speed, and thus estimation of the obstacle position and prediction of the vehicle path can be precisely performed.

Embodiment 2

A configuration of Embodiment 2 of the present invention includes vehicle position estimation device instead of the obstacle position estimation device 8 in Embodiment 1.

The vehicle position estimation device calculates a yaw angle $\theta$ and a center of gravity position of the vehicle (Xv, Yv) at the present time from a vehicle speed V, a yaw angular velocity $\gamma$, a sideslip angle $\beta$, an arithmetical operation cycle $\Delta t2$, a yaw angle $\theta z$ of the last arithmetical operation cycle, and a center of gravity position of the vehicle (Xvz, Yvz) of the last arithmetical operation cycle by the following expression.

$$\theta = \theta z + \gamma \cdot \Delta t2$$

$$Xv = Xvz + V \cdot \cos(\beta + \theta) \cdot \Delta t2 \qquad \text{[Expression 10]}$$

$$Yv = Yvz + V \cdot \sin(\beta + \theta) \cdot \Delta t2$$

Vehicle path prediction device 9 uses the following expression instead of Expression 6.

$\gamma[0]=\gamma$ $\beta[0]=\beta$ $\theta[0]=\theta$ $Xv[0]=Xv$ [Expression 11]

$YV[0]=Yv$

Other configurations are the same as in Embodiment 1.

Figure 12:
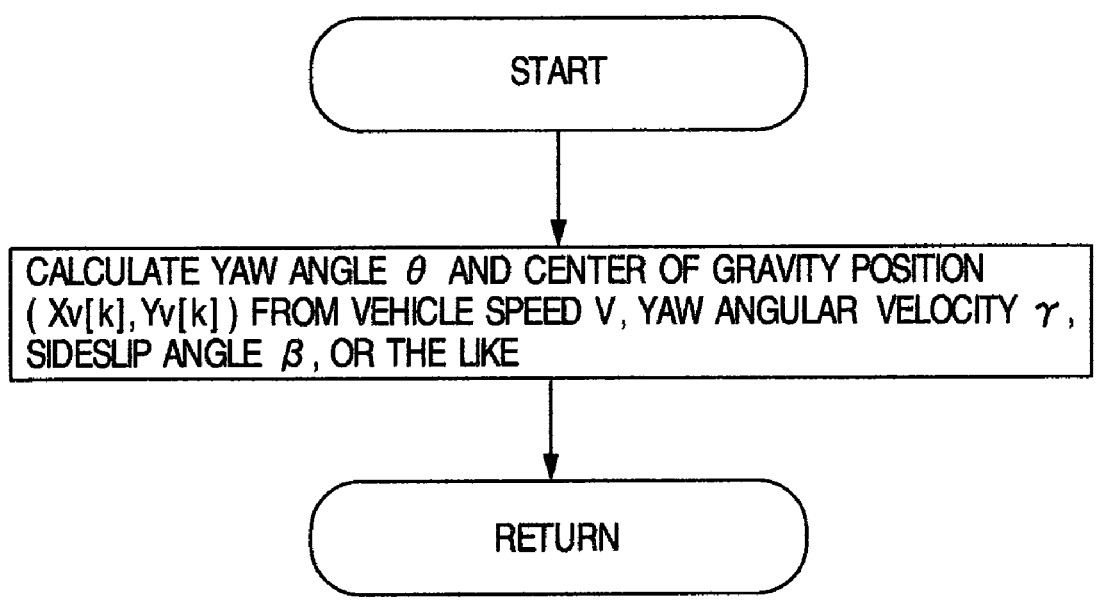
FIG. 12 shows an example of a flow of calculation by vehicle position estimation device in Embodiment 2.

A flow of calculation in Embodiment 2 of the present invention is shown in FIG. 12 showing a flow of calculation by the vehicle position estimation device replacing FIG. 7 in Embodiment 1.

The vehicle position estimation device calculates, in S21, the yaw angle θ and the center of gravity position of the vehicle (Xv, Yv) at the present time using Expression 10, and finishes the processing.

In S10 in FIG. 8 showing the flow of the calculation by the vehicle path prediction device 9, Expression 11 is used instead of Expression 6.

Other flows of calculations are the same as in Embodiment 1.

According to the above described configuration, a collision can be precisely predicted, and a driver can be informed of the presence of the obstacle or the vehicle can be controlled so as not to approach the obstacle when there is a risk of run off or collision as in Embodiment 1.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An active safety device for a motor vehicle comprising:
   obstacle detection device for detecting an obstacle;
   vehicle path prediction device for predicting a future path of the vehicle;
   collision possibility calculation device for calculating the possibility of a collision between the vehicle and the obstacle; and
   collision responding device for informing a driver of the presence of the obstacle or controlling the vehicle so as not to approach the obstacle according to the possibility of the collision between the vehicle and the obstacle,
   wherein the device further comprises:
   obstacle storage device for storing a position of the obstacle; and
   position estimation device for estimating a relative position between the vehicle and the obstacle based upon the position of the obstacle stored by the obstacle storage device, a vehicle speed of the vehicle, a yaw angular velocity of the vehicle, and a vehicle sideslip angle defined as an angle of vehicle center of gravity in a traveling direction relative to a longitudinal axis on a fixed coordinate system of the vehicle.

2. The active safety device for a motor vehicle according to claim 1, wherein the position estimation device estimates a relative position between an obstacle that cannot be detected at present by the obstacle detection device and the vehicle from the position of the obstacle stored by the obstacle storage device, the vehicle speed of the vehicle, the yaw angular velocity of the vehicle, and the sideslip angle of the vehicle.

3. The active safety device for a motor vehicle according to claim 1, wherein the position estimation device estimates a present position of the vehicle from the vehicle speed of the vehicle, the yaw angular velocity of the vehicle, and the sideslip angle of the vehicle.

4. The active safety device for a motor vehicle according to claim 1, wherein the position estimation device estimates a relative position between a tire of the vehicle and the obstacle from the position of the obstacle stored by the obstacle storage device, the vehicle speed of the vehicle, the yaw angular velocity of the vehicle, the sideslip angle of the vehicle, and a relative position between a vehicle body and the tire of the vehicle.

5. The active safety device for a motor vehicle according to claim 1, wherein the obstacle storage device changes a cycle of storing the position of the obstacle according to the vehicle speed of the vehicle.

6. The active safety device for a motor vehicle according to claim 1, further comprising obstacle storage elimination device for eliminating storage of one obstacle when stored two obstacles are positioned close to each other.

7. The active safety device for a motor vehicle according to claim 1, wherein the obstacle storage device changes the number of obstacles to be stored according to the vehicle speed of the vehicle.

8. The active safety device for a motor vehicle according to claim 1, further comprising sideslip angle estimation device for estimating a sideslip angle of the vehicle from the vehicle speed of the vehicle, a steering angle of the vehicle, and/or the yaw angular velocity of the vehicle.

9. A method for active safety of a motor vehicle comprising:
   detecting an obstacle;
   storing a position of the obstacle;
   estimating a relative position between the vehicle and the obstacle based on the stored position of the obstacle, a speed of the vehicle, a yaw angular velocity of the vehicle, and a vehicle sideslip angle defined as an angle of vehicle center of gravity in a traveling direction relative to a longitudinal axis on a fixed coordinate system of the vehicle;
   predicting a future path of the vehicle;
   calculating possibility of a collision between the vehicle and the obstacle from the estimated relative position of the vehicle and the obstacle and the predicted future path of the vehicle; and
   informing a driver of the presence of the obstacle or controlling the vehicle so as not to approach the obstacle according to the possibility of the collision between the vehicle and the obstacle.

10. The method for active safety of a motor vehicle according to claim 9, wherein the estimating step estimates a relative position between an obstacle that cannot be detected at present by the detecting step and the vehicle from the stored position of the obstacle, the speed of the vehicle, the yaw angular velocity of the vehicle, and the sideslip angle of the vehicle.

11. The method for active safety of a motor vehicle according to claim 9, wherein the estimating step estimates a present position of the vehicle from the speed of the vehicle, the yaw angular velocity of the vehicle, and the sideslip angle of the vehicle.

12. The method for active safety of a motor vehicle according to claim 9, wherein the estimating step estimates a relative position between a tire of the vehicle and the obstacle from the stored position of the obstacle, the speed of the vehicle, the yaw angular velocity of the vehicle, the sideslip angle of the vehicle, and a relative position between a vehicle body and the tire of the vehicle.

13. The method for active safety of a motor vehicle according to claim 9, wherein the storing step includes changing a cycle of storing the position of the obstacle according to the speed of the vehicle.

14. The method for active safety of a motor vehicle according to claim 9, further comprising eliminating storage of one obstacle when stored two obstacles are positioned close to each other.

15. The method for active safety of a motor vehicle according to claim 9, wherein the storing step includes changing the number of obstacles to be stored according to the speed of the vehicle.

16. The method for active safety of a motor vehicle according to claim 9, further comprising estimating a sideslip angle of the vehicle from the speed of the vehicle, a steering angle of the vehicle, and/or the yaw angular velocity of the vehicle.

* * * * *